United States Patent [19]
Matsushita et al.

[11] Patent Number: 6,151,166
[45] Date of Patent: *Nov. 21, 2000

[54] COLOR SEPARATION ELEMENT AND IMAGE DISPLAY DEVICE USING SAME

[75] Inventors: Tomohiko Matsushita; Masayuki Shinohara; Shigeru Aoyama, all of Kyoto, Japan

[73] Assignee: Omron Corporation, Kyoto, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/081,629

[22] Filed: May 19, 1998

[30] Foreign Application Priority Data

May 22, 1997 [JP] Japan ..................................... 9-150413

[51] Int. Cl.$^7$ .............................. G02B 27/44; G02B 5/18; G02F 1/1335; F21V 7/04
[52] U.S. Cl. .............................. 359/566; 359/571; 349/5; 349/57; 349/65; 362/31
[58] Field of Search ..................................... 359/566, 567, 359/571, 578, 615; 349/64, 5, 57, 65, 201; 362/31

[56] References Cited

U.S. PATENT DOCUMENTS 5,528,720  6/1996  Winston et al. ..................... 385/146
5,831,765  11/1998  Nakayama et al. .................. 359/464

*Primary Examiner*—Jon Henry
*Attorney, Agent, or Firm*—Majestic, Parsons, Siebert & Hsue P.C.

[57] ABSTRACT

A color image display device has a light source which emits an approximately parallel beam of light, a color separation element for separating this parallel beam into beams of light of different colors, a liquid crystal display panel having picture elements and a lens array for focusing the separated beams at corresponding ones of these picture elements. The color separation element is formed with a prism array having two diffraction gratings on both sides of it such that a beam of white light passing through it will be separated into beams of different colors and the angles between the optical axes of these beams of different colors will be greater as they leave the separation element than if this beam of white light passed through only one of these diffraction gratings. Either one or both of these diffraction gratings may be integrally formed respectively on one or both of the surfaces of the prism array.

16 Claims, 4 Drawing Sheets

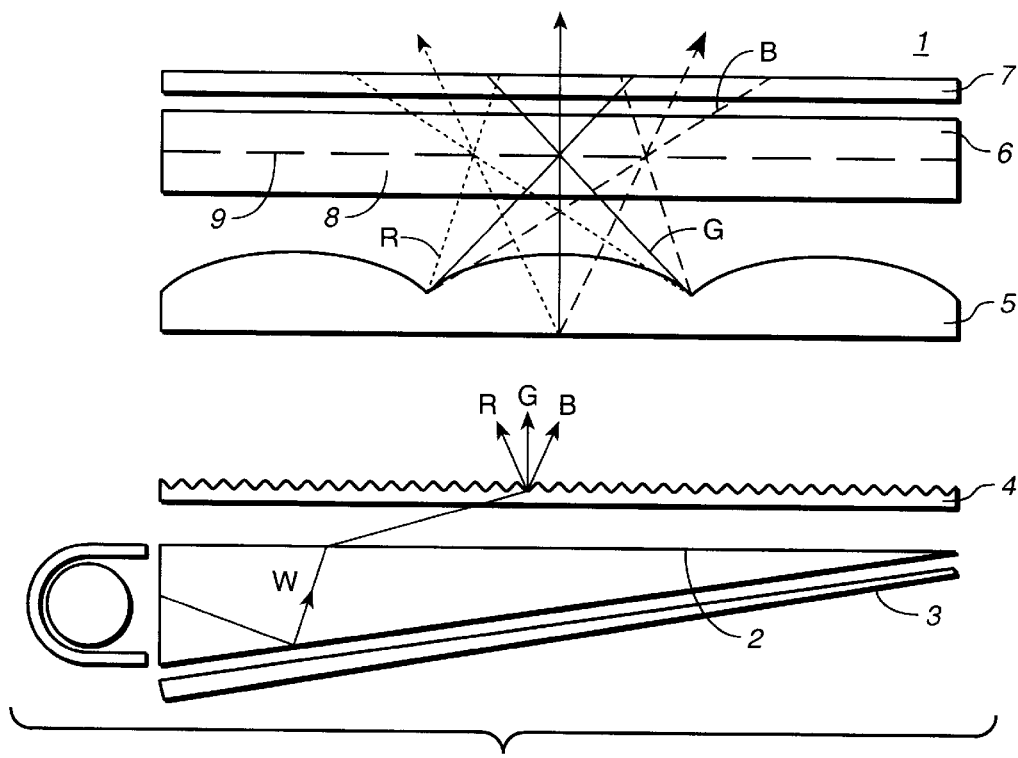
FIG._1
(PRIOR ART)
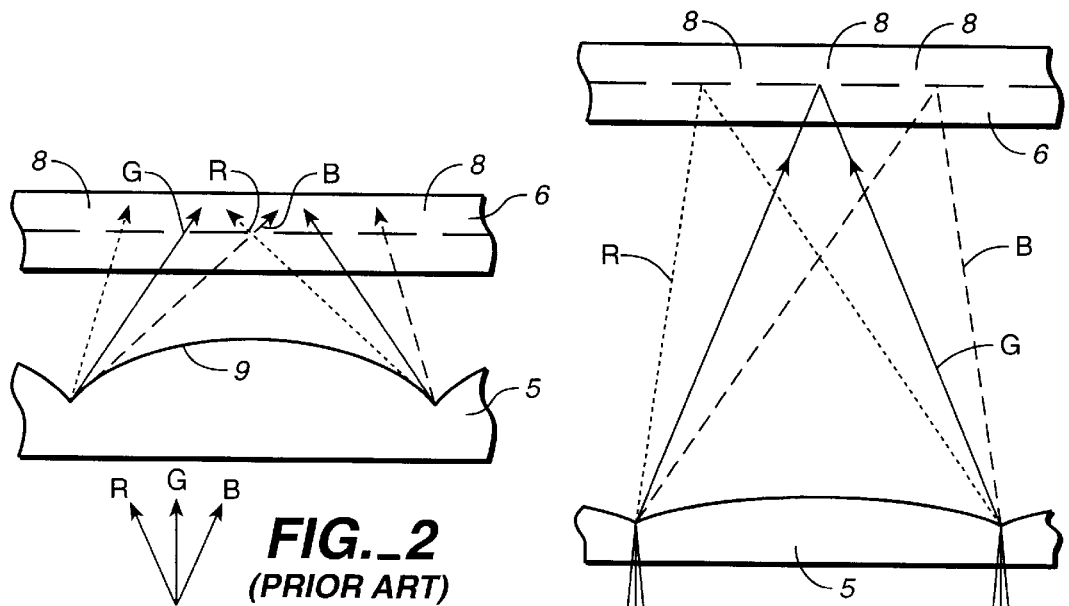
FIG._2
(PRIOR ART)
FIG._3
(PRIOR ART)

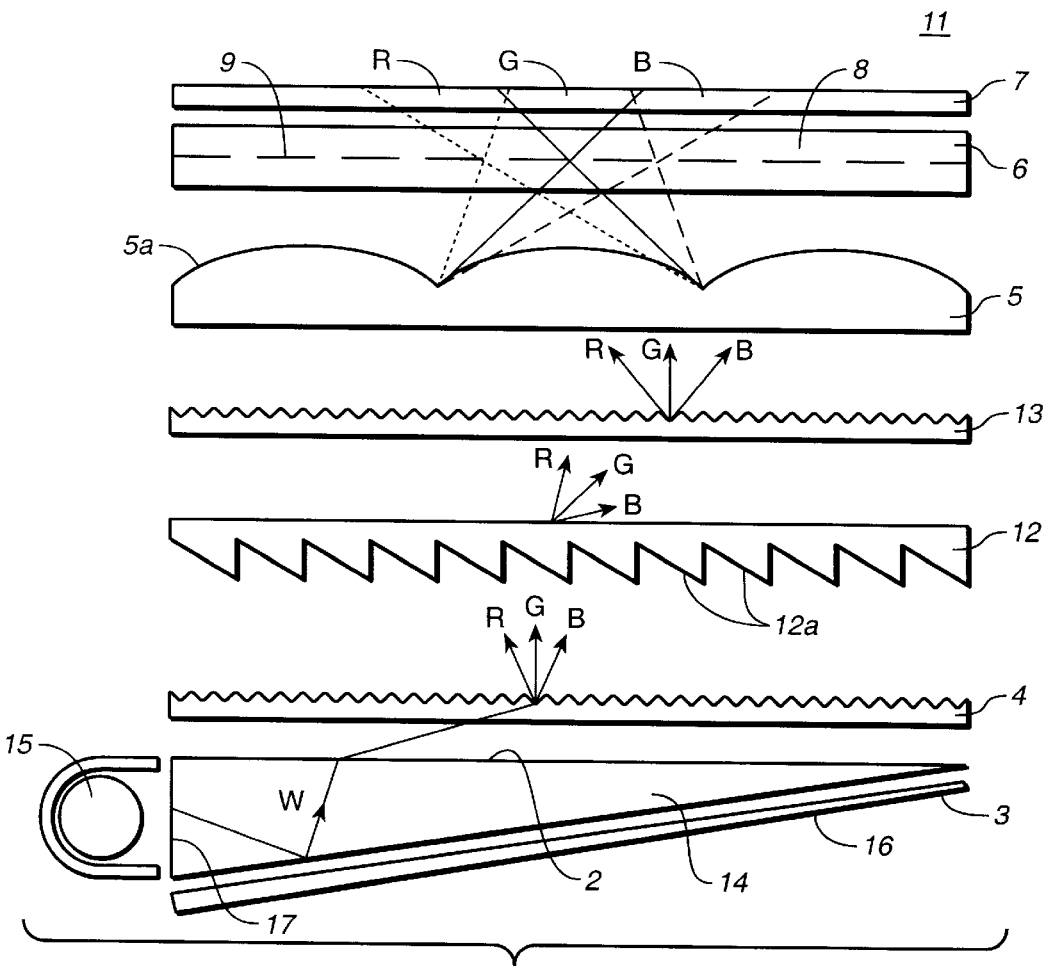
FIG._4
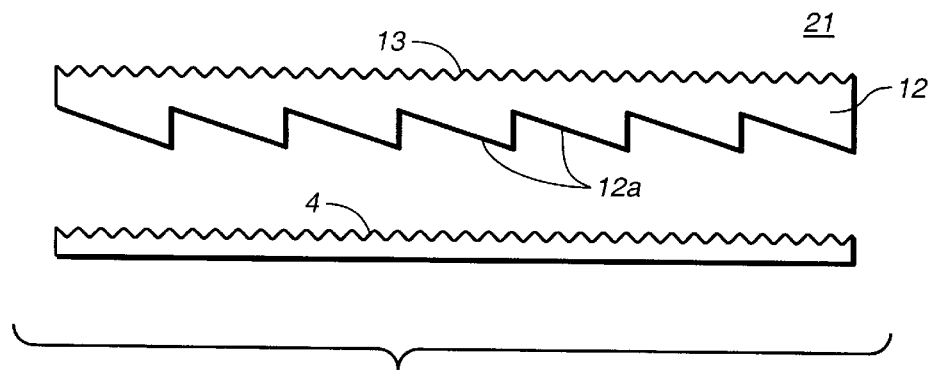
FIG._5

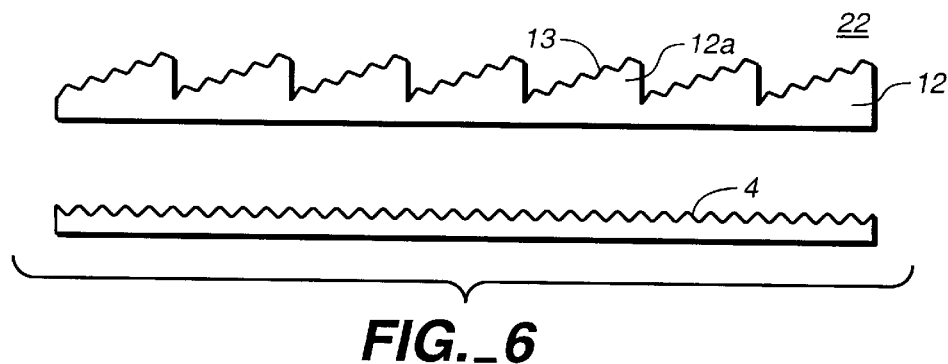
FIG._6
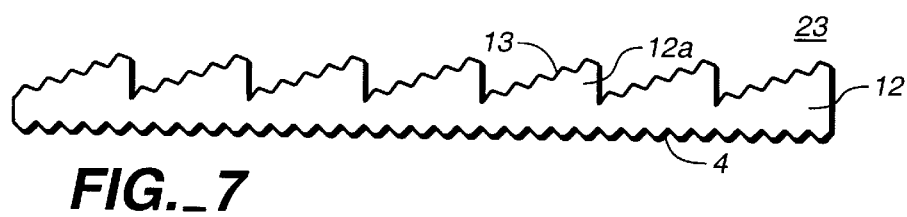
FIG._7
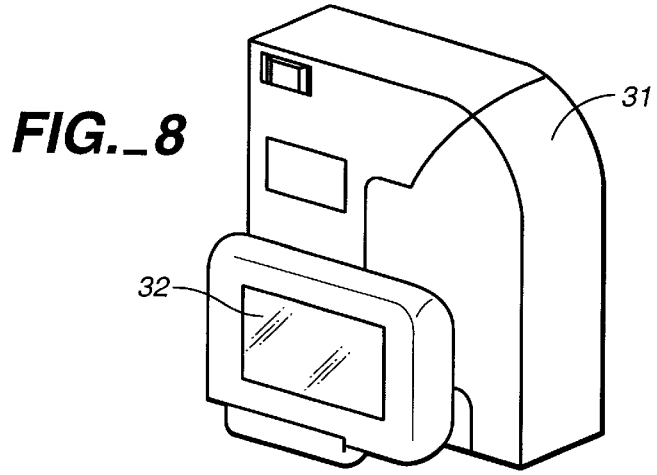
FIG._8
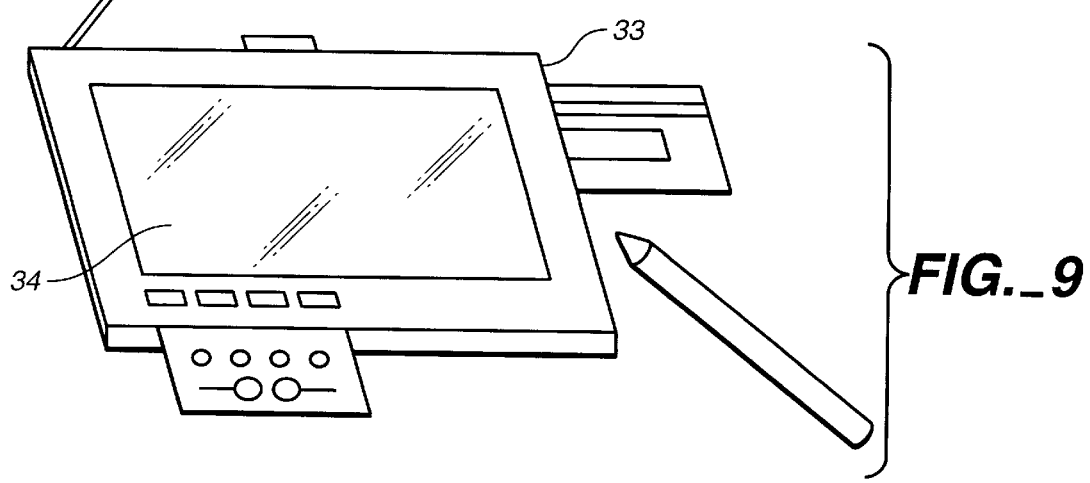
FIG._9

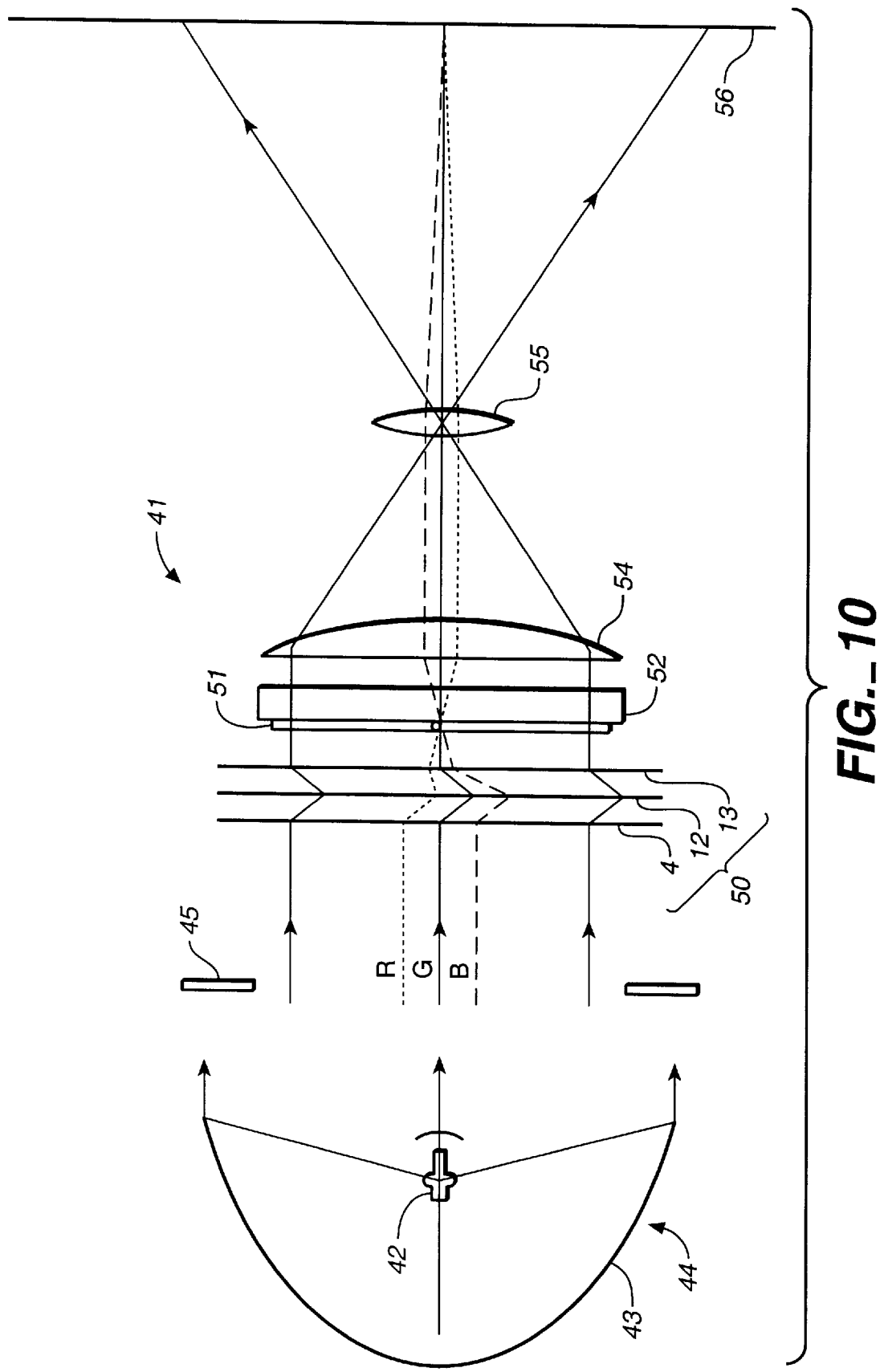
FIG._10

COLOR SEPARATION ELEMENT AND IMAGE DISPLAY DEVICE USING SAME

BACKGROUND OF THE INVENTION

This invention relates to color separation elements and image display devices. More particularly, this invention relates to color separation elements with high color separation capability and image display devices for displaying colors by using such an element.

Color display devices using only one diffraction grating have been disclosed, for example, in Japanese Patent Publications Tokkai 62-293222 and 6-222361. FIG. 1 shows an example of prior art color image display device 1 comprising a surface light source (back-lighting) device 3 for emitting a beam of light which is approximately parallel to its light-emitting surface 2, a single diffraction grating 4 which serves as a color separation element, a microlens array 5 for collecting light on picture elements on a liquid crystal display panel 6 and a diffusion plate 7. When a parallel beam of white light W is emitted from the light-emitting surface 2 of the light source device 3, it is separated by the diffraction grating 4 into red light R, green light G and blue light B and is diffracted into different directions. Since these beams of light with different colors are collected (focussed) at different positions by passing through the microlens array 5, it is possible to form an image display device for a color display without using any color filter if the liquid crystal display panel 6 is arranged such that its picture elements (or the element openings) are at the focal positions of each color. In FIG. 1, as well as in the following figures, the beam of red light R is shown by dotted lines, that of green light is shown by solid lines and that of blue light is shown by broken lines.

With an image display device thus structured, however, the spectral characteristics are not sufficiently strong and the angles between the optical axes of light beams corresponding to different colors are relatively small because only one diffraction grating is used for color separation. As a result, it often happens, as shown in FIG. 2, that beams of red light B, green light G and blue light B reach the next picture element from the ones where they are intended to be focussed. For example, a portion of the red light R passing through the microlens array 5 is made incident onto the neighboring blue and green picture elements, adversely affecting the picture quality of the formed image.

If the spectral characteristics of the diffraction grating 4 are not sufficiently strong, furthermore, the beams of red, green and blue light focussed by the microlens array 5 are made incident also on black matrix areas 9, and this means a loss of light or that there is less for forming the image.

One of the methods for preventing poor picture quality for such reasons has been to make use of a microlens array 5 with a long focal length, as shown in FIG. 3, such that the focal points for the red light R, the green light G and the blue light B are sufficiently separated. By such a method, however, the distance between the microlens array 5 and the liquid crystal panel 6 becomes large. This has the unfavorable effect of increasing the thickness of the image display device 1 as a whole.

Japanese Patent Publication Tokkai 4-60538 disclosed a color image display device using dichroic mirrors but dichroic mirrors are relatively expensive and do not contribute to the miniaturization of the image display device.

SUMMARY OF THE INVENTION

It is therefore an object of this invention in view of the above to provide a color separation element with strong spectral characteristics.

It is another object of this invention to provide such a color separation element which is relatively inexpensive and does not cause the image displaying device which incorporates it to be bulky.

It is an additional object of this invention to provide an image display device for color display using such a color separation element.

Color separation elements embodying this invention, with which the above and other objects can be accomplished, may be characterized as having a diffraction grating on both sides of a prism array such that a beam of white light passing through it will be separated into beams of different colors and the angles between the optical axes of these beams of different colors will be greater as they leave the separation element than if this beam of white light passed through only one of these diffraction gratings. In other words, color separation elements according to this invention have stronger spectral characteristics and can separate light of different colors by larger angles. According to a preferred embodiment, the prism array and the two diffraction gratings are arranged such that the direction of diffraction by the diffraction gratings and that of refraction by the prism array are opposite to each other. It is further preferred if either or both of the diffraction gratings are formed integrally with the prism array such that the number of components can be reduced and the element becomes less bulky.

A color image display device according to this invention may be characterized not only as comprising a light source which emits an approximately parallel beam of light, a color separation element for separating this parallel beam into beams of light of different colors, a liquid crystal display panel having picture elements and a lens array for focusing the separated beams at corresponding ones of these picture elements but also wherein the color separation element is one that embodies this invention, having two diffraction gratings on both sides of a prism array as described above. Incorporating a color separation element with improved spectral characteristics, a color image display device of this invention can display color images with improved color quality.

BRIEF DESCRIPTION OF THE DRAWINGS

The accompanying drawings, which are incorporated in and form a part of this specification, illustrate an embodiment of the invention and, together with the description, serve to explain the principles of the invention. In the drawings:

FIG. 1 is a schematic sectional view of a prior art image display device;

FIG. 2 is a schematic sectional view of a portion of a prior art image display device to show its problems;

FIG. 3 is a schematic sectional view of a portion of another prior art image display device to show its problem;

FIG. 4 is a schematic sectional view of an image display device with a color separation element embodying this invention;

FIGS. 5, 6 and 7 are schematic sectional views of other color separation elements embodying this invention;

FIG. 8 is a diagonal view of a video camera provided with a color image display device embodying this invention;

FIG. 9 is a diagonal view of a portable work station with a color image display device embodying this invention; and FIG. 10 is a schematic sectional view of a liquid crystal image projector incorporating a color separation element embodying this invention shown in FIG. 4.

DETAILED DESCRIPTION OF THE INVENTION

FIG. 4 shows an image display device 11 according to one embodiment of this invention, comprising a surface light source device 3, a color separation element which includes a first diffraction grating 4, a prism array 12 and a second diffraction grating 13, a microlens array 5, a liquid crystal display panel 6 and a diffusion plate 7. The surface light source device 3 is formed by setting a light source 15 adjacent an end surface 17 of a light-conducting plate 14 made of a transparent resin material with a high index of refraction such as polycarbonate resins or methacrylic resins and placing a reflector sheet 16 on the lower surface of the light-conducting plate 14. As a beam of white light W is emitted from the light source 15, it enters the interior of the light-conducting plate 14 through its end surface 17 and propagates inside the light-conducting plate 14 by repeatedly undergoing total reflections. The light which thus propagates inside the light-conducting plate 14 is emitted from its light-emitting surface 2 when the angle of incidence, as the light hits the light-emitting surface 2 from inside, becomes smaller than the critical angle for the total reflection. The portion of light which is emitted out of the light-conducting plate 14 through its lower surface is reflected back by the reflector sheet 16 and enters the interior of the light-conducting plate 14 again. As a result, the incident white light W from the light source 15 into the interior of the light-conducting plate 14 is projected out as an approximately parallel beam nearly uniformly from all parts of the light-emitting surface 2 of the light-conducting plate 14.

The approximately parallel beam of white light W, thus projected out of the light-emitting surface 2 of the light-conducting plate 14 is diffracted first by the first diffraction grating 4 disposed opposite the light-emitting surface 2. The light-conducting plate 14 and the first diffraction grating 4 are designed such that the diffracted beams of the first order by the first diffraction grating 4 will thereafter propagate approximately perpendicularly to the grating 4. Since the angle of diffraction depends on the wavelength of the light, the first-order diffracted beams of red light R, green light G and blue light B are separated and travel in different directions.

Next, the first-order diffracted beams of light, thus separated into red, green and blue by the first diffraction grating 4, pass through the prism array 12 and are each refracted by a corresponding one of its prisms 12a. Since the angle of refraction of the light passing through the prism array 12 depends also on the wavelength of the light, the red light R, the green light G and the blue light B are refracted by different angles. The prism array 12 is arranged in such a way that the angles between the optical axes of the red light R, the green light G and the blue light will become even larger after they pass through the prism array 12. The pattern angle of the prism array 12 (the bottom angle of each prism 12a) is designed such that light of each color will be directed approximately parallel to the prism array 12.

After passing through the prism array 12, the red light R, the green light G and the blue light B are each diffracted by the second diffraction grating 13 and their first-order diffracted beams are directed to the microlens array 5. The first-order diffracted beams from the second diffraction grating 13 are in the same direction as those diffracted by the first diffraction grating 4 such that the angles between the optical axes of the red light R, the green light G and the blue light B become even greater after the diffraction by the second diffraction grating 13.

The microlens array 5 is formed with microlenses 5a arranged two-dimensionally such that three mutually adjacent picture elements of the liquid crystal display panel 6 correspond to one of the microlenses 5a. Since the optical axes of the red light R, the green light G and the blue light B which are made incident onto the microlens array 5 are in different directions, these beams of light are focussed at different positions after passing through the microlens array 5, that is, at different ones of three mutually adjacent picture elements 8. This group of three pictures elements through which the red light R, the green light G and the blue light B pass corresponds to one image point. Thus, the color display of an image can be made by switching on and off each picture element 8. The red light R, the green light G and the blue light B, after passing through the picture elements 8 of the liquid crystal display panel 6, are diffused by the diffusion plate 7 and emitted out in a wider angle.

In summary, since the angles between the optical axes of the red light R, the green light G and the blue light B are gradually widened as the beams pass through the first diffraction grating 4, the prism array 12 and the second diffraction grating 13, the focal points of these light beams with different colors can be sufficiently separated and the spectral characteristic can be improved although the distance between the microlens array 5 and the liquid crystal display panel 6 is not increased. Thus, images can be displayed with improved color reproduction. Moreover, since the light beams are less likely to be screened by the black matrix areas 9, the loss in the quantity of light can be reduced.

It is to be noted that the prism array 12 has the additional function of adjusting the direction of light incident on the second diffraction grating 13. For this reason, it is so arranged that the angular deflection by the prism array 12 should be opposite to that by the first and the second diffraction gratings 4 and 13.

FIG. 5 shows another color separation element 21 according to this invention which is different from the color separation element incorporated in the image display device of FIG. 4 wherein the second grating 13 is integrally formed on the surface of the prism array 12 opposite from its patterned surface. The first diffraction grating 4 is disposed opposite the patterned surface of the prism array 12.

FIG. 6 shows still another color separation element 22 according to this invention characterized as having the second diffraction grating 13 formed integrally on the patterned surface of the prism array 12, the first diffraction grating being disposed opposite the other surface of the prism array 12.

FIG. 7 shows still another color separation element 23 according to this invention characterized as having both the second diffraction grating 13 and the first diffraction grating 4 formed integrally respectively on the patterned surface and the opposite surface of the prism array 12.

If the diffraction grating 13 and the prism array 12 are thus integrated, not only is the spectral characteristic of the color separation element improved but the element can also be made thinner with the number of components thereby reduced. By incorporating such an element, an image display device can be made smaller, say, than if use is made of dichroic mirrors for color separation.

An image display device embodying this invention can be used as a part of many different kinds of apparatus, although not separately shown or illustrated, such as liquid crystal televisions and liquid crystal displays of a notebook type personal computer. FIG. 8 shows a video camera 31 provided with a color image display device 32 embodying this invention on which the picture being taken may be displayed or a recorded image may be reproduced. FIG. 9 shows a portable work station 33 with an image display device 34 embodying this invention.

FIG. 10 shows an example of liquid crystal color image projector 41 incorporating a color separation element embodying this invention. Numeral 44 indicates a back-light source having a lamp 42 and a reflector 43 with a paraboloidal surface placed behind it. Light emitted from the lamp 42 is reflected by this reflector 43 to form an approximately parallel beam of light which is made incident through a slit 45 onto a color separation element 50 embodying this invention. The color separation element 50 may, for example, be of the kind shown in FIG. 4 having a first diffraction grating 4, a prism array 12 and a second diffraction grating 13. An image formed through a microlens array 51 on a liquid crystal display panel 52 is thereby projected through a field lens 54 and a projection lens 55 onto a screen 56.

The disclosure is intended to be interpreted broadly. Many modifications and variations that may be apparent to a person skilled in the art, although not specifically disclosed, are intended to be included within the scope of the invention.

What is claimed is:

1. A color separation element comprising:
   a prism array with two mutually opposite main surfaces having a plurality of aligned prisms;
   two diffraction gratings one on each side of said prism array, each of said two diffraction gratings diffracting and thereby separating a beam of white light incident thereonto into beams of light with different wavelengths; and
   means for passing light through one of said diffraction gratings to be thereby diffracted and to reach said prism array and thereafter through the other of said diffraction gratings to be thereby diffracted thereby.

2. The color separation element of claim 1 wherein said prism array and said two diffraction gratings are arranged such that light beams of different colors forming a beam of white light passing therethrough are separated by larger angles than if said beam of white light passed through only one of said diffraction gratings.

3. The color separation element of claim 1 wherein said prism array and said two diffraction gratings are arranged such that the direction of diffraction by said diffraction gratings is opposite the direction of refraction by said prism array.

4. The color separation element of claim 2 wherein said prism array and said two diffraction gratings are arranged such that the direction of diffraction by said diffraction gratings is opposite the direction of refraction by said prism array.

5. The color separation element of claim 1 wherein one of said diffraction gratings is integrally formed on one of said main surfaces of said prism array.

6. The color separation element of claim 2 wherein one of said diffraction gratings is integrally formed on one of said main surfaces of said prism array.

7. The color separation element of claim 5 wherein the other of said diffraction gratings is integrally formed on the other of said main surfaces of said prism array.

8. The color separation element of claim 6 wherein the other of said diffraction gratings is integrally formed on the other of said main surfaces of said prism array.

9. An image display device comprising:
   a light source which emits an approximately parallel beam of light;
   a color separation element for passing said parallel beam of light from said light source and thereby separating said parallel beam into beams of light of different colors, said color separation element comprising a prism array with two mutually opposite main surfaces having a plurality of aligned prisms and two diffraction gratings, one on each side of said prism array;
   a liquid crystal display panel having picture elements; and
   a lens array for causing said separated beams to be focussed at corresponding ones of said picture elements.

10. The image display device of claim 9 wherein said prism array and said two diffraction gratings are arranged such that light beams of different colors forming a beam of white light passing therethrough are separated by larger angles than if said beam of white light passed through only one of said diffraction gratings.

11. The image display device of claim 9 wherein said prism array and said two diffraction gratings are arranged such that the direction of diffraction by said diffraction gratings is opposite the direction of refraction by said prism array.

12. The image display device of claim 10 wherein said prism array and said two diffraction gratings are arranged such that the direction of diffraction by said diffraction gratings is opposite the direction of refraction by said prism array.

13. The image display device of claim 9 wherein one of said diffraction gratings is integrally formed on one of said main surfaces of said prism array.

14. The image display device of claim 10 wherein one of said diffraction gratings is integrally formed on one of said main surfaces of said prism array.

15. The image display device of claim 13 wherein the other of said diffraction gratings is integrally formed on the other of said main surfaces of said prism array.

16. The image display device of claim 14 wherein the other of said diffraction gratings is integrally formed on the other of said main surfaces of said prism array.

* * * * *